D. Overholtzer's Bag-Fastener.

73193

PATENTED JAN 7 1868

Witnesses:
Theo Gnsche
Wm. Truwn

Inventor
D. Overholtzer
Per Munn
Attorneys

United States Patent Office.

DANIEL OVERHOLTZER, OF POLO, ILLINOIS.

Letters Patent No. 73,193, dated January 7, 1868.

---

IMPROVED BAG-FASTENER.

---

*The Schedule referred to in these Letters Patent and making part of the same.*

---

TO ALL WHOM IT MAY CONCERN:

Be it known that I, DANIEL OVERHOLTZER, of Polo, in the county of Ogle, and State of Illinois, have invented a new and improved Bag-Fastener; and I do hereby declare that the following is a full, clear, and exact description thereof, which will enable others skilled in the art to make and use the same, reference being had to the accompanying drawings, forming part of this specification, in which—

Figure 1:
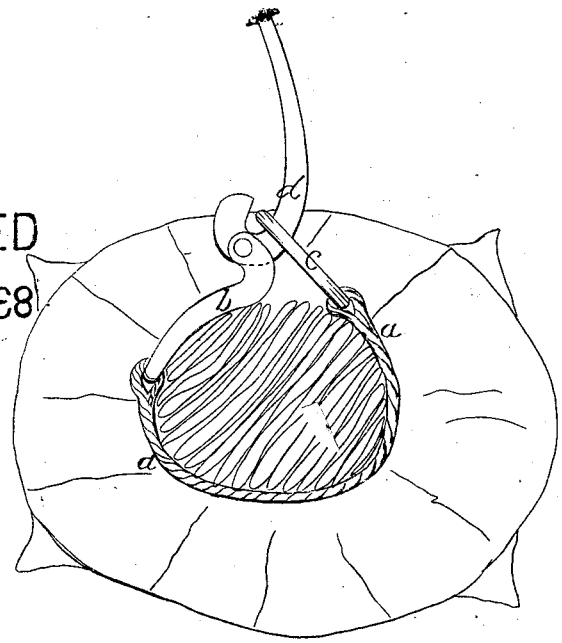
Figure 1 represents my improved device for fastening bags before it is secured.
Figure 3:
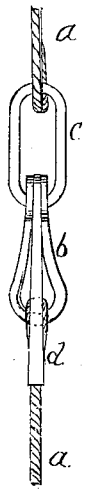

Figure 3, a detached view of the device.

Similar letters of reference indicate corresponding parts.

This invention relates to an improved device for fastening the mouth of a bag of grain or other commodity, and consists in an iron hook pivoted to a link, and so arranged, in connection with another link through which it passes, that by moving in one direction on the pivot the bag is fastened by a cord attached to both links, and by moving in the opposite direction the bag is unfastened, as hereinafter described.

Figure 2:
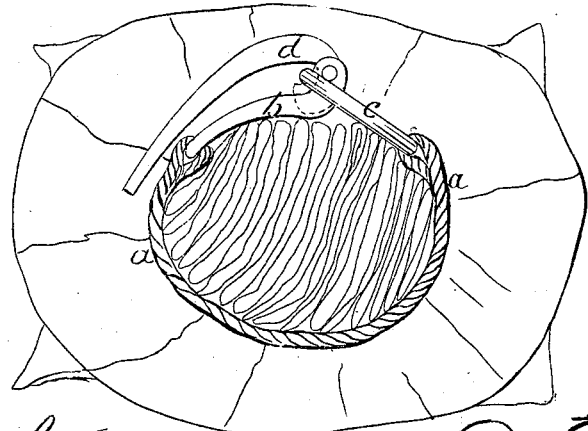
Figure 2 represents the same after it is secured around the mouth of a bag.

A cord, $a$, is attached at one end to an iron link, $b$, and at the other end to a link, $c$, the cord $a$ being made or cut the proper length for fastening a bag when drawn tight around the mouth, which is folded or gathered up in the usual way. The link $b$ is formed with an open hook at one end, and the two sides of the hook enclose a locking-hook, $d$, which is pivoted at the extreme point of its bend to the end of the hook on the link $b$, in such manner that when the long part or shank of the hook is passed through the link $c$, it may be drawn forward with the link $c$, to carry it over so as to catch in the hook of the link $b$, and there catch and be held tight by a locking-effect when the cord $a$ is passed around the mouth of a bag, as shown in fig. 2. When this has been done, the shank of the locking-hook $d$ lies flat against the neck of the bag, and the device keeps the bag closed. It may be opened instantly by raising the locking-hook $d$.

Having thus described my invention, what I claim as new, and desire to secure by Letters Patent, is—

The bag-fastener, constructed as described, consisting of the link $b$, having an open hook at one end, between the sides of which the bend of the locking-hook $d$ is pivoted, in such a manner that the link C, when placed over the locking-hook, will clamp the bend of said hook in the hooked end of the open link $b$, as herein shown and described.

The above specification of my invention signed by me, this 19th day of September, 1867.

DANIEL OVERHOLTZER.

Witnesses:
GEORGE W. WATERS,
L. F. KING.